United States Patent [19]

Soerens

[11] Patent Number: 5,025,046

[45] Date of Patent: Jun. 18, 1991

[54] CREPING ADHESIVE COMPOSITION

[75] Inventor: Dave A. Soerens, Neenah, Wis.

[73] Assignee: Kimberly-Clark Corporation, Neenah, Wis.

[21] Appl. No.: 451,491

[22] Filed: Dec. 15, 1989

[51] Int. Cl.⁵ ............................................. C08L 97/00
[52] U.S. Cl. ....................................... 524/72; 524/73; 524/366; 524/379; 524/380; 524/389; 106/501; 106/503
[58] Field of Search ................... 524/72, 73, 366, 379, 524/380, 389; 106/501, 503

[56] References Cited

U.S. PATENT DOCUMENTS

| | | | |
|---|---|---|---|
| 4,000,237 | 12/1976 | Roberts, Jr. | 264/128 |
| 4,304,625 | 12/1981 | Grube et al. | 162/111 |
| 4,440,898 | 4/1984 | Pomplum et al. | 524/503 |
| 4,501,640 | 2/1985 | Soerens | 162/111 |
| 4,528,316 | 7/1985 | Soerens | 524/503 |
| 4,608,111 | 8/1986 | Hume, III et al. | 156/306.6 |

Primary Examiner—John Kight, III
Assistant Examiner—Sam A. Acquah
Attorney, Agent, or Firm—Gregory E. Croft

[57] ABSTRACT

An aqueous adhesive composition which contains polyvinyl alcohol, polyethylene oxide, and lignin sulfonate is useful as a creping adhesive in the manufacture of tissue products such as facial tissue, bath tissue and paper toweling.

6 Claims, No Drawings

CREPING ADHESIVE COMPOSITION

BACKGROUND OF THE INVENTION

In the manufacture of creped tissue products, such as facial tissue, bath tissue, paper towels and the like, a paper web is adhered to a rotating cylinder (Yankee) and dislodged (creped) with a doctor blade. Adhesion of the web to the rotating cylinder is generally augmented with the application of a creping adhesive to either the cylinder surface or the web itself. Polyvinyl alcohol (PVA) is a common component of such creping adhesives because of its water solubility and adhesion properties. However, other materials have also been used for creping adhesive compositions.

For example, U.S. Pat. Nos. 4,501,640 and 4,528,316 to Soerens disclose a creping adhesive composition comprising an admixture of polyvinyl alcohol and a cationic polyamide resin. U.S. Pat. No. 4,304,625 to Grube et al. discloses a creping adhesive composition comprising polyvinyl alcohol and polyvinyl acetate-ethylene copolymer. U.S. Pat. No. 4,000,237 to Roberts, Jr. discloses various bonding materials, including polyvinyl alcohol, carboxymethyl cellulose and polyacrylamide. U.S. Pat. No. 4,440,898 to Pomplun et al. discloses a creping adhesive comprising an admixture of an ethylene oxide/propylene oxide compolymer and a high molecular weight thermoplastic polymer such as polyvinyl alcohol and polyvinyl pyrrolidone. U.S. Pat. No. 4,608,111 to Hume et al. discloses an adhesive composition useful in the manufacture of hard cover books, which contains polyvinyl alcohol and about 1 to 8 parts lignin sulfonate per each part polyvinyl alcohol. Notwithstanding the many different kinds of creping adhesives known in the tissue making art, there remains a continual need for improved creping adhesive compositions which provide greater adhesion.

SUMMARY OF THE INVENTION

In one aspect, the invention resides in an aqueous creping adhesive composition containing dissolved or suspended solids which comprise polyvinyl alcohol, polyethylene oxide, and lignin sulfonate. Preferably, the creping adhesive consists of from about 0.5 to about 15 weight percent solids and from about 85 to about 99.5 weight percent water. The solids portion of the composition preferably comprises from about 5 to about 35 weight percent lignin sulfonate, from about 1 to about 15 weight percent polyethylene oxide, and from about 65 to about 90 weight percent polyvinyl alcohol. The creping adhesives of this invention have an anionic charge and are particularly advantageous for creping webs which have been treated with cationic resins such as wet strength agents or retention aids. They also may be useful for improving the adhesion of webs which have been treated with cationic debonding agents.

Hence in another aspect, the invention resides in a method of making a creped tissue web suitable for use as facial tissue, bath tissue, or paper toweling, the method comprising making a paper web containing a cationic resin, adhering the cationic resin-containing web to the surface of a creping cylinder with a creping adhesive comprising an aqueous blend of water and dissolved or suspended solids, said solids comprising polyvinyl alcohol, polyethylene oxide, and lignin sulfonate, and dislodging the paper web from the surface of the creping cylinder with a doctor blade to produce a creped tissue product. The paper web to be creped in accordance with this invention can be made by any tissue making process as are well known in the papermaking arts, including wet pressing methods and throughdrying methods. The cationic resin can be any cationic resin or compound, including without limitation those commonly used as wet strength agents, debonding agents, or retention aids. Examples of suitable cationic resins include those described in U.S. Pat. No. 2,926,116 issued to Keim on Feb. 23, 1960 and U.S. Pat. No. 3,058,873 issued to Keim on Oct. 16, 1962, both of which are incorporated herein by reference. Other suitable cationic resins include dry strength resins, such as those described by U.S. Pat. No. 2,963,396 issued to Padbury et al. on Dec. 6, 1960 and those described by U.S. Pat. No. 2,923,701 issued to Schuller et al. on Feb. 2, 1960, both patents being incorporated herein by reference. Other suitable cationic materials include polymeric quaternary ammonium compounds useful as debonding agents, such as those described in U.S. Pat. No. 4,506,081 issued to Fenyes et al. on Mar. 19, 1985, which is also incorporated herein by reference.

Lignin is a major constituent of wood and woody plants comprising about one quarter of the dry weight of such materials. It appears to function as a natural plastic binder for the cellulosic fibers which make up the structural units of the plant. During the pulping process lignin is made water soluble by reaction with sulfite resulting in sulfonation. The product derived from the solubilized sulfonated lignin are referred to as lignin sulfonate.

Lignin sulfonates, which are derived from the sulfonation of lignin during the pulping of woody fibers, commonly contain many sulfonated compounds with a broad range of molecular weights and degrees of sulfonation. The structure of lignin sulfonate cannot be completely determined; however, it appears to be a mixture of polymers containing units of aromatic rings, methoxy groups, aromatic and aliphatic hydroxyl groups and ketone and aldehyde carboxyl groups. It appears that the basic monomeric unit of lignin is a sulfonated substituted guaicyl propane. They can contain small amounts of natural sugars such as mannose, glucose, xylose and galactose, and can contain small amounts of higher molecular weight polysaccharides. Lignin sulfonates are commonly available from a number of commercial sources as light brown dried powders or as viscous aqueous solutions. Lignin sulfonate has a variety of properties making it useful in dispersants, binders, sequestering (chelating) agents, flotation reagents, emulsifiers, emulsion stabilizers and water treating agents.

Polyvinyl alcohol (PVA), a polyhydroxy polymer having a polymethylene backbone with pendent hydroxy groups, is a water soluble synthetic resin. It is produced by the hydrolysis of polyvinyl acetate. Polyvinyl alcohol is one of the very few high molecular weight commercial polymers that is water soluble. It is commonly available as a dry solid and is available in granular or powdered form. PVA grades include both the fully hydrolyzed form (99%+ removal of the acetate group), a form of intermediate hydrolysis (about 98 to 91% removal of acetate group), and a partly hydrolyzed (about 90 to 85% removal of the acetate group polyvinyl alcohol. The properties of the resins vary according to the molecular weight of the parent polymer and the degree of hydrolysis. Polyvinyl alcohols are commonly produced in nominal number average molecular weights that range from about 20,000 to 100,000. Commonly the molecular weight of commercial polyvinyl alcohol grades is reflected in the viscosity of a 4 wt. % solution measured in centipoise at 20° C. with a Brookfield viscometer. The viscosity of a 4% solution can range from about 5 to about 65 centipoise. Variation in flexibility, water sensitivity, ease of solvation, viscosity, block resistance, adhesive strength, dispersing power can all be varied by adjusting molecular weight or degree of hydrolysis. Solutions of polyvinyl alcohol in water can be made with large quantities of lower alcoholic cosolvents and salt cosolutes.

Polyvinyl alcohol is made by first forming polyvinyl acetate and removing the acetate groups using a base catalyzed alkanolysis. The production of polyvinyl acetate can be done by conventional processes which control the ultimate molecular weight. Catalyst selection temperatures, solvent selection and chain transfer agents can be used by persons skilled in the art to control molecular weight. The degree of hydrolysis is controlled by preventing the completion of the alkanolysis reaction. Polyvinyl alcohol is made in the United States by Air Products & Chemicals, Inc. under the tradename VINOL TM and by duPont under the tradename EL-VANOL TM.

Polyethylene oxides are water-soluble polymers made by anionic polymerization of ethylene oxide. The general chemical structure is a diol with a polyether repeat unit as follows: $HOCH_2—(CH_2—OCH_2)_n—CH_2OH$. Lower molecular weight polyethylene oxides are also called poly(ethylene glycols). Commercially available materials are made by Union Carbide Corporation under the tradename CARBOWAX and are designated by a number approximately equal to the molecular weight. For example, CARBOWAX 400 is a polyethylene oxide having an average molecular weight of 400 ($n=7-8$ in the formula above).

The creping adhesives of this invention are useful in the manufacture of tissues, such as facial and bath tissue, and paper towels. They can be prepared simply by blending aqueous solutions (at concentrations up to about 15 weight percent) in the desired proportions.

DETAILED DESCRIPTION OF THE INVENTION

To illustrate the effectiveness of the creping adhesives of this invention for improving adhesion, aqueous creping adhesives having 8 percent by weight solids were prepared as described above using different combinations of: polyvinyl alcohol (VINOL 540, 87% hydrolysis, average molecular weight of 125,000, manufactured by Air Products & Chemicals); lignin sulfonate (Orzan AL50, ammonium lignin sulfonate manufactured by ITT Rayonier Forest Products); and polyethylene oxide (Carbowax 400, average molecular weight of 400, manufactured by Union Carbide). Each creping adhesive was coated onto a cast iron plate with a wire wound rod and allowed to air dry. A strip of cotton cloth, 2 inches wide, was soaked in water and then gently wrung out to remove excess water. (The moisture content of the cloth was about 40% by weight). The wet cotton cloth was placed on the coated cast iron plate and rolled down with a 10 pound roller. The test panel was placed in an oven set at 110 degrees C. and heated for 10 minutes. During this heating period, the water evaporated to leave the cloth dry to the touch. The hot test panel was then transferred to an adhesion tester and the cotton cloth was peeled away from the plate at an angle of 180 degrees at a speed of 12 inches per minute while the peel force was measured by the load cell. The average peel force over a peel distance of 1 inch was recorded.

To determine the effect of treating the cellulosic web with a cationic resin, the procedure was repeated except that, instead of water, the cotton cloth was soaked in a dilute solution (0.25 weight percent) of a cationic polyamide resin (KYMENE 557H, manufactured by Hercules, Inc.). Suitable cationic resins are described in U.S. Pat. No. 4,528,316 issued to D. A. Soerens on July 9, 1985, which is herein incorporated by reference. The peel adhesion results of both tests are summarized in the Table below.

TABLE

| | | (Peel Adhesion) | | | |
|---|---|---|---|---|---|
| Sample | PVA (weight percent) | Lignin Sulfonate (weight percent) | Polyethylene Oxide (weight percent) | Adhesion (Water soak) (grams) | Adhesion (Kymene soak) (grams) |
| 1 | 74 | 13 | 13 | 465 | 644 |
| 2 | 60 | 40 | 0 | 346 | 380 |
| 3 | 65 | 25 | 10 | 397 | 360 |
| 4 | 100 | 0 | 0 | 358 | 539 |
| 5 | 60 | 20 | 20 | 286 | 416 |
| 6 | 60 | 0 | 40 | 143 | 244 |
| 7 | 80 | 0 | 20 | 352 | 225 |
| 8 | 85 | 5 | 10 | 641 | 603 |
| 9 | 80 | 20 | 0 | 435 | 483 |
| 10 | 65 | 5 | 30 | 333 | 469 |

The results show that the combination of all three components provides a synergistic increase in adhesion that is not evident when only two of the components are combined. For example, comparing the adhesion (with water soak) for Sample 8, which contains all three components, to the two-component blend of Sample 7 (PVA and polyethylene oxide) and the two-component blend of Sample 9 (PVA and lignin sulfonate), reveals that the three-component blends considerably higher in adhesion even though the PVA content is close to that of the two-component blends. Note, however, that excess polyethylene oxide (20 percent or more) results in lower adhesion. Note also that in most cases the blends which contain the anionic lignin sulfonate exhibit higher adhesion when the cellulosic substrate is treated with the cationic resin KYMENE.

It will be appreciated that the foregoing examples, shown for purposes of illustration, are not to be construed as limiting the scope of this invention, which is defined by the following claims.

I claim:

1. A creping adhesive comprising from about 85 to about 99.5 weight percent water and from about 0.5 to about 15 weight percent dissolved or suspended solids, said solids comprising from about 65 to about 90 weight percent polyvinyl alcohol, from about 1 to about 15 weight percent polyethylene oxide, and from about 5 to about 35 weight percent lignin sulfonate.

2. The creping adhesive of claim 1 comprising about 10 weight percent solids.

3. The creping adhesive of claim 2 wherein the amount of lignin sulfonate is about 15 weight percent, based on the total amount of solids.

4. The creping adhesive of claim 3 wherein the amount of polyethylene oxide is about 15 weight percent, based on the total amount of solids.

5. The creping adhesive of claim 2 wherein the amount of lignin sulfonate is about 5 weight percent, based on the total amount of solids.

6. The creping adhesive of claim 5 wherein the amount of polyethylene oxide is about 10 weight percent, based on the total amount of solids.

* * * * *